United States Patent [19]

Adams et al.

[11] 3,950,480
[45] Apr. 13, 1976

[54] METHOD FOR EMBOSSING PLASTIC MATERIAL

[75] Inventors: James M. Adams, Terre Haute; Randall R. Hopper, Shelburn; Robert R. Pease; Garland E. Raley, both of Terre Haute, all of Ind.

[73] Assignee: Ethyl Corporation, Richmond, Va.

[22] Filed: May 7, 1975

[21] Appl. No.: 575,224

Related U.S. Application Data

[63] Continuation of Ser. No. 323,055, Jan. 12, 1973, abandoned.

[52] U.S. Cl. .............................. 264/284; 264/210 R
[51] Int. Cl.² ...................... B29B 3/00; B29C 15/00
[58] Field of Search ............................ 264/284, 210

[56] References Cited
UNITED STATES PATENTS

| | | | |
|---|---|---|---|
| 2,567,275 | 9/1951 | Colombo | 264/284 X |
| 2,928,124 | 3/1960 | Hugger | 264/284 X |
| 3,170,974 | 2/1965 | Jacobs | 264/284 |
| 3,283,378 | 11/1966 | Cramton | 264/210 X |
| 3,311,692 | 3/1967 | Baird | 264/210 X |
| 3,502,765 | 3/1970 | Spencer | 264/284 X |
| 3,540,959 | 11/1970 | Connor | 264/284 X |

FOREIGN PATENTS OR APPLICATIONS
719,964    1954    United Kingdom............ 264/284

*Primary Examiner*—Richard R. Kucia
*Attorney, Agent, or Firm*—Donald L. Johnson; John F. Sieberth; David L. Ray

[57] ABSTRACT

A method for embossing thermoplastic material and the thermoplastic material produced thereby. A transverse section of a continuous length of preformed thermoplastic film is heated by a nondirect contact heat source to raise the temperature of the film above its softening point. The film is then fed immediately between adjacent, counter-rotating embossing rollers, thereby embossing a raised pattern onto the film. The rollers are cooled to fix the embossed pattern on the film. The embossed film has good moduli, low surface gloss or light reflectance, deep embossed pattern, high tensile strength and high impact strength.

10 Claims, 1 Drawing Figure

U.S. Patent  April 13, 1976  3,950,480
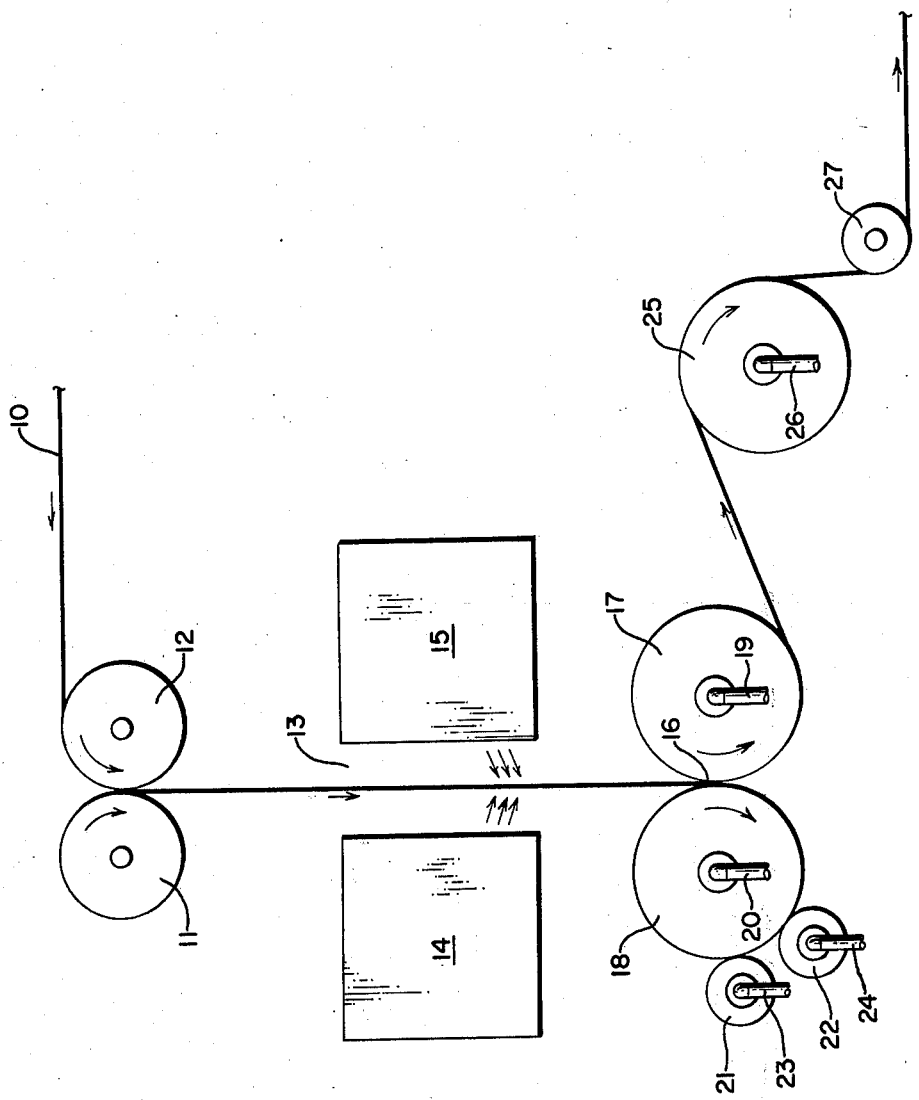

METHOD FOR EMBOSSING PLASTIC MATERIAL

This is a continuation, of application Ser. No. 323,055 filed 1-12-73, now abandoned.

BACKGROUND OF THE INVENTION

1. Field of the Invention

This invention relates to a method for producing embossed thermoplastic sheet materials and to the embossed thermoplastic material produced thereby.

2. Description of the Prior Art

Embossed plastic film or sheet material has come into widespread use in many fields. One particularly large scale use of embossed thermoplastic sheet material is that of disposable articles such as hospital pads and drapes, wearing apparel and disposable diapers. Embossed film is also finding increased use in the packaging field, for example, as bags and overwraps for articles such as clothing, etc., and for shopping bags. In order to fulfill the requirements established by the end use of embossed film, it is desirable that the film have little or no tendency to curl when run through fabricating machines, particularly those used for manufacture of disposable clothing articles, e.g., diapers. In some cases, it is important that the embossed thermoplastic film be soft and flexible and have the proper pattern and embossment depth in order to provide the desired "hand" or clothlike feel for the thermoplastic embossed material. Additionally, it is desired that the embossed thermoplastic material for many uses have as low a surface gloss as possible in order to simulate woven, clothlike fabrics. Further, embossed thermoplastic materials must meet the minimum physical requirements necessary for the films to be handled in high speed, automatic, fabricating machinery, i.e., it should have suitable modulus, tensile strength and impact strength.

Heretofore, embossed thermoplastic films such as polyethylene, polypropylene, polybutene-1, polyvinyl chloride, and other flexible thermoplastics normally extruded into film have been made by various methods. One method used to prepare embossed thermoplastic film is to extrude the thermoplastic material, e.g., polyethylene, from a conventional slot extrusion die onto a continuously moving, smooth, cooled casting surface, e.g., a chill roll. The engraved pattern may be applied to the chill roll and the film pressed to the roll while in the amorphous or molten stage by press rolls. Alternatively, the chill roll may be very smooth and the desired pattern in the film may be impressed into the film on the chill roll by means of an engraved or machined embossing roll which is pressed against the film and the chill roll to impress the pattern into the film as it is cooled on the chill roll. The softness of embossed film produced by chill casting is directly related to the density of the polyethylene resin used. In order to obtain different degrees of softness or stiffness, it is necessary to use a number of polyethylene resins having different densities. Thus, if it is desired to produce a relatively stiff embossed film, it is necessary to use more expensive polymers having high densities as the feed material to the slot die. Additionally, it is difficult to change many of the physical characteristics desired in the film when using the foregoing slot die-chill cast roll embossing technique. The embossed films made by the above described process often produce poor roll conformation, i.e., have hard or soft spots, wrinkle or sag due to the inability to distribute zones of thickness variation across the width of the roll of embossed film. Embossed film rolls of poor conformation produces problems when running the film through fabricating machines or through a film printing apparatus.

As an example of a method and apparatus for producing film according to the foregoing slot die-chill cast roll technique is shown in U.S. Pat. No. 3,374,303.

Another technique used for embossing plastic film heretofore has been the utilization of a heated engraved embossing roll used in conjunction with a backup roll. The preformed strip of thermoplastic film, normally at room temperature, is passed between the nip of a heated engraved roll and a backup roll and is embossed by being heated while in contact with the heated, engraved roller. The resultant embossed film usually has a very shallow and poorly defined pattern. An example of an apparatus and process for carrying out embossing of this type is shown in U.S. Pat. No. 3,176,058.

A third process for embossing thermoplastic film used heretofore has been to pass the film over a heated roll or a series of heated rollers in order to heat the film to a softened state and then to contact the film with an embossing roller and to press the film against the embossing roller by a backup roller. Normally, the embossing roller and the backup roller are cooled in order to freeze the embossed pattern into the film so that it may be immediately wound up into rolls, if desired. An apparatus and process for preparing an embossed film according to the foregoing is shown in U.S. Pat. No. 3,246,365.

One of the drawbacks when using the heated drum or roll method to apply heat to the film prior to embossing is the difficulty in heating the film sufficiently so that it will take a deep, permanent embossed pattern which is a true reproduction of the engraved surface of the engraving roll. If the film is heated sufficiently to obtain a very deep and permanent impression when pressed against the engraving roll, oftentimes the film will stick or adhere to the heating rolls, thus causing tears or slack or drape problems in handling the film between the heating rolls and the embossing rolls. Since the film cannot be heated by this method to the required temperature, this results in a loss of the density depression in the resin which is desired oftentimes to produce very soft, flexible film. Density depression produced in an embossed film is directly dependent on the quench rate applied to the film.

Thus, it can be seen that the film embossing art is in need of the process of the present invention whereby preformed thermoplastic film can be rapidly heated to a sufficiently high temperature, embossed, and then quickly cooled to obtain a density depression in film and thereby obtain a deep, permanent embossed pattern on the film and yet which will provide wide variation in control of the parameters which will permit variation in the physical properties of the embossed film, i.e., modulus, surface gloss, embossed pattern depth, tensile strength and impact strength.

SUMMARY OF THE INVENTION

It is an object of the present invention to provide a process for producing embossed thermoplastic film which permits wide variation in the physical properties of the embossed film.

It is a further object of the present invention to provide a method for producing embossed thermoplastic film from a tubular film produced by the blown bubble process.

It is a still further object of the present invention to produce an embossed thermoplastic film having desirable physical properties.

The process aspects of the present invention may be carried out by passing a length of preformed film through a zone wherein the film is heated by a non-contacting heat source to raise the temperature of the film to a range of from about 220°F to about 250°F. The film is immediately simultaneously quenched and embossed by passing the film between the nip of a pair of cooled embossing rolls maintained at a temperature in the range of from about 20°F to about 150°F. The film is then wound on a roll, if desired.

The embossed film aspect of the present invention can be realized in an embossed thermoplastic film that has little or no tendency for edge curl, has a modulus between 9000 psi and 25,000 psi, a surface gloss between 3 and 10, a tensile strength between 1500 psi and 3000 psi and an impact strength between 50 grams and 200 grams.

BRIEF DESCRIPTION OF THE DRAWING

The drawing is a side, elevational view of an apparatus for carrying out the process of the present invention and for producing the thermoplastic embossed film of the present invention.

DESCRIPTION OF THE PREFERRED EMBODIMENTS

Referring to the drawing, there is depicted an apparatus for embossing a thermoplastic film or web for carrying out the process for producing the embossed film of the present invention. A preformed, flat, longitudinally extending, endless web of thermoplastic film 10 is fed through the nip of counter-rotating, driven pull rolls 11 and 12. Pull rolls 11 and 12 are preferably driven by a variable speed drive mechanism (not shown) which permits variation in speed of these pull rolls. The film then passes downwardly through an opening 13 provided between spaced apart left-hand heat source 14 and right-hand heat source 15. The film 10 which may be at ambient temperature prior to entering the space 13 is rapidly heated by radiant, convection, or forced air heating supplied from the heating sources 14 and 15 to raise the temperature of the film above its softening point, preferably to a temperature around the crystalline melting point ($T_m$) of the polymeric material from which the thermoplastic film is formed. The heat softened film then passes into the nip 16 formed by the hollow contacting metal embossing roll 17 and the hollow resilient covered backup roll 18. The metal embossing roll has the desired embossing pattern for the film on its outer cylindrical surface. The pattern may be any pattern desired, i.e., it may be a male pattern wherein the surface of the roll 17 has uniform protuberances extending outwardly from its surface, or it may be a female pattern wherein the roll surface is provided with uniform depressed areas over its entire surface or a combination of male and female. Backup roll 18 is preferably a cylindrical metal roll having a resilient covering over its outer cylindrical surface and is pressed into contact with the embossing roll with sufficient pressure to press the heated film 10 into the embossing pattern of the metal embossing roll 17 in order to create the embossed design in the heated film. Embossing roll 17 is provided with a fluid coolant inlet conduit 19 and an outlet conduit (not shown) on the opposite end of the roll for circulation of coolant through the hollow embossing roll. The hollow backup roll 18 is likewise provided with an inlet coolant conduit 20 and also is provided with an exit conduit on the opposite end (not shown).

A pair of cooling rolls 21 and 22 are mounted so that their surfaces contact the resilient covered surface of the backup roll 18. Upper cooling roll 21 is provided with a coolant inlet conduit 23 and the lower cooling roll 22 is likewise provided with an inlet coolant conduit 24. The surfaces of cooling rolls 21 and 22 are preferably metal and serve to remove heat from the resilient covering (not shown) on the backup roll 18, thereby to enhance the cooling of the film 10 as it is received in the nip 16 in order to freeze the embossed pattern into the film as it passes through its nip. While it is preferred to utilize coolant rolls such as those shown in the drawing, it is understood that the invention is not limited thereto, and cooling may be supplied only by circulating coolant through the embossing and the backup rolls. After the heated web 10 has been embossed, it is maintained in contact with the embossing roll 17 through an arc of from about 10° to about 180°, preferably about 90°, and then is next passed over auxiliary or post cooling roller 25. Post cooling roller 25 is equipped with coolant inlet conduit 26 and has a coolant exit at the other end (not shown). Embossed web 10 is maintained in contact with the post cooling roll through about 90° of travel and is then next received on idler roller 27 from which it can then move to a windup roll on a wind stand (not shown) for reeling into the desired size roll of embossed film. Alternatively, the embossed web may be fed directly to fabricating machines if an in-line embossing, fabricating operation is desired.

The non-contacting radiant, convention, or forced air heat sources 14 and 15 may be any number of suitable heat sources for supplying heat to rapidly heat the web 13. Each heat source 14 and 15 may utilize electrically powered resistance heaters which are spaced from each other on each side of the traveling film web 10 and positioned to supply a high level of heat energy transversely to the film web as it passes through the space between the heating sources. Electrical heating sources such as the rod type resistant radiant heaters used in industrial heating and drying ovens, i.e., Calrod type, are also suitable for use as heat sources for the units 14 and 15. In addition to electrically powered sources, fuel powered sources may be used for heat sources in this process to apply heat input to the film. Elongated gas burners may be mounted transversely to the direction of travel of the film and spaced on each side of the film at sufficient distance to avoid burning or melting the film, yet sufficiently close to apply heat uniformly across the film from both sides to raise the film to the necessary temperature for embossing. In addition to open flame fuel heaters, the process of the present invention may be carried out by using high energy, flameless, catalytic heaters as a non-contacting heat source for heating the film.

The preferred method of heating the film in the process of the present invention is to utilize circulating hot air supply sources as the heat supplies 14 and 15 on each side of the web. The air may be heated by any suitable means, i.e., gas open flame, gas catalytic heater, electrical resistance heater, electrical infrared heaters, and is preferably applied to each side of the web from the heat sources 14 and 15 in the form of a relatively high velocity, narrow, transverse band extending the width of the film on each side of the film and at opposed areas on each side of the film. For example, the hot air flow may be supplied to the film over a zone as shown by the arrows on each side of the film in the drawing. If desired, the heating sources 14 and 15 may be the hot air, recirculating type, wherein after the flowing streams of heated air are applied to the sides of the film, at least a portion of the air is recirculated back into the hot air heating sources 14 and 15 in order to conserve energy.

While it is not critical that the heating sources 14 and 15 be any specific distance above the nip 16 of the embossing and backup rolls, it is preferred to maintain the distance between the nip 16 and the point or points at which the heat is applied to the web as short a distance as possible. Preferably, the zone or length of travel of the film from the time it is exposed to the non-contacting heat source until it reaches the nip 16 of the embossing and backup rolls should not have a length of greater than about 20 inches. More preferably, the zone should have a length between about 6 inches and about 14 inches. It is desirable to maintain the length of the film when it is in the heated state as short as possible in order to avoid fluttering of the soft, flexible, heated film and additionally to prevent sagging or stretching of the film when it is in the very semi-fluid, softened state.

While the temperature to which the traveling film 10 is heated in the heating zone by the heat sources 14 and 15 will be dependent upon the nature of the thermoplastic material from which the film is made, it is a very important feature of the present invention that the film be heated to a temperature sufficiently high to permit deep embossing, i.e., to a temperature at least approaching the softening temperature for the particular polymer from which the film is made. By softening temperature is meant a temperature sufficiently high to relax an amorphous or noncrystalline film. For semi-crystalline polymers, such as low and medium density polyethylene, and crystalline polymers, such as polypropylene, the softening temperature is meant to be a temperature on either side of the crystalline melting point of such polymers. For film made of polymers having a defined crystalline melting point ($T_m$), the film should be heated by a noncontacting heat source, preferably heated air, to raise the film temperature to a range within about ±20°F of the crystalline melting point of the polymer from which the film is made. More preferably, the film should be heated to a temperature within a range of about −20°F to about +10°F of the crystalline melting point of the polymer. For film made from polymers which do not have a well defined crystalline melting point, e.g., polystyrene, some low density polyethylenes, etc., the film should be heated to a temperature where the film becomes soft enough to accept a deep, permanent embossed pattern, i.e., where substantially all previous orientation that may have been applied to the film is relieved.

Another critical parameter to control in the process of the present invention is the surface temperature of the metal embossed roller which should be controlled at a temperature over the range about 70°F to about 170°F lower than the crystalline melting temperature of the polymer used to produce the film being embossed. An additional parameter to be controlled is the surface temperature of the rubber backup roll which should be maintained at a temperature from about 125°F to about 180°F below the crystalline melting temperature of the polymer being processed. The temperature of the coolant supplied to the embossing roller and the backup roller will be dependent upon the particular construction and heat transfer of the two rolls and can be readily determined by experimental trials. In practicing the process of the present invention when embossing polyethylene films (low, medium and high density), it has been found that controlling the temperature of the liquid coolant supplied to the embossing roll over the range from about 20°F to about 150°F has been satisfactory. The coolant temperature for the resilient covered roll has a range of from about 5°F to about 100°F for embossing the above noted films.

Pressure applied to the embossing roll and the rubber backup roll to create nip pressure will depend upon the particular type of polymer being processed and the pattern depth and configuration used on the embossing roll, and also on the resilient properties of the covering used on the backup roll. Generally, pressures in the range of 50 to 500 pounds per linear inch have been found satisfactory for producing an embossed taffeta film by the present process.

The speed or the linear velocity at which the film is moved through the heating zone and the embossing and backup rolls will be dependent upon the thickness of the film and the particular polymer from which the film is made. Suitable speeds for embossing film can be readily determined by experimental evaluation. In general, films from one-half mil to 12 mils in thickness can be satisfactorily embossed at speeds ranging from 30 ft./min. to 500 ft./min. The pattern on the embossing roll 17 may be any pattern desired. However, for best results in producing soft, flexible embossed film with low gloss and good modulus, it has been found that the pattern should be small and have sharp breaks and have a minimum of flat surfaces so as to reduce reflection of incident light (gloss) on the embossed film. While male or female patterns may be used, it has been found that the good results are obtained when using a male (protruding) pattern since this provides easier balance of heat transfer from the two sides of the film web to the metallic embossing roll and to the resilient backup roll. When removal of the heat from both sides of the film is balanced, this reduces the rate of uneven crystalline growth in the film and thus minimizes the tendency of the film to curl on the edges after it leaves the embosser. In general, patterns on the embossing roll may be produced by any of the conventional methods used for producing embossing rolls, i.e., etching, machining, knurling, intaglio etching, or any other suitable means. It is preferred that the pattern, whether it be male or female, have either protuberances or recesses in the range of from about 20 points/in. to about 250 points/in. One of the preferred patterns is a male quadrangular pattern having 55 points/in. and having a recess depth of about 0.0043 inch. However, any pattern can be used which will produce a satisfactorily embossed film.

The resilient cover material for the backup roll may be any suitable material having sufficient resiliency and life to create sharp impressions on the film against the etched or engraved pattern on the embossing roll. Among the most suitable materials is a neoprene covered backup roll. However, polyurethane, natural rubber, other rubbers, and other suitable resilient materials can be used.

The process of the present invention may use any thermoplastic material capable of being formed into thin flexible sheets or webs which are capable of being embossed and retaining an embossed pattern. Among suitable polymers that can be used for preparing the film to be embossed by the present invention and to produce the embossed film product of the present invention are polymers of alpha-olefins having 2 to 4 carbon atoms such as low density polyethylene, medium density polyethylene, high density polyethylene, polypropylene, polybutene-1, and copolymers thereof with each other and with other polymerizable comonomers. Other satisfactory films can be made from the polymerizable vinyl monomers, i.e., films such as polystyrene, polyvinyl chloride, polyvinylidene chloride, and copolymers of these monomers with other comonomers, e.g., ethylene, vinyl acetate, acrylic acid and others. Also suitable are nylon and other polyamide films and copolymers of like type. Cellulosic polymers such as cellulose nitrate, cellulose acetate, cellulose butyrate and others may be used for the film which can be embossed. Other suitable films can be made from styrene-nitrile type polymers such as styrene-acrylonitrile copolymers, styrene-acrylonitrile graft polymers with other comonomers, e.g., methyl acrylate, which are grafted on rubber substrates. Additionally, embossed films according to the present invention can be made from multilayer films such as polyethylene:nylon; high density polyethylene:low density polyethylene:-high density polyethylene; low density polyethylene:-polyvinyl acetate:low density polyethylene; low density polyethylene: polypropylene:low density polyethylene; and otheres.

The process of the present invention has been used to prepare embossed film having excellent "hand" or feel and excellent softness from low density polyethylene film having a thickness from 0.5 mil to 5.0 mils. These embossed films have had an embossed depth of 3.5 ±0.5 mil, a modulus (standard 1 percent secant) of less than 14,000 lb/in.$^2$ in the machine direction and less than 14,000 lb/in.$^2$ in the transverse direction when using a square pattern on the embossing roll on one mil thick film Embossed films having a modulus of less than 14,000 lb/in.$^2$ in the machine direction and greater than 14,000 lb/in.$^2$ in the transverse direction were obtained when using a diamond pattern on the embossing roll. The embossed films produced had tensile strengths (measured at 25 percent elongation) in the range of from 600 to 900 pounds. The taffeta or embossed film produced had a gloss of from 3 to 10 points as determined by a Gardner Gloss Meter employing a 45° head. The process conditions utilized to produce the foregoing embossed films included raising the temperature of the moving film in the heating zone to a temperature in the range of 220°–250°F. The temperature on the face or outer surface of the embossing roll was maintained in the range of 70°–170°F. The roll face temperature on the rubber backup roll was maintained in the range of 60°–115°F. Liquid coolant supplied to the embossing roll was maintained in the temperature range of 20°–150°F and cooling liquid supplied to the rubber roll was maintained in the temperature range of 5°–100°F.

When using recirculating hot air ovens as the heat source in the above process, polyethylene films having a thickness from 0.50 mil to 12.0 mils were embossed successfully using heating air applied to each side of the film having temperatures ranging from 200°–800°F. Other examples of embossed film produced by the process of the present invention are set forth in Table I. Table II give the process conditions used.

TABLE I

| | Film Type | | | | | |
|---|---|---|---|---|---|---|
| | Vinyl[3] | | EVAC[4] | HDPE[5] | LDPE[1] | LDPE[2] |
| Properties | Before Embossing | After Embossing | After Embossing | After Embossing | After Embossing | After Embossing |
| Tensile-psi M.D. | 4,412 | 4,374 | 4,113 | 5,308 | 3,076 | 2,940 |
| Tensile-psi T.D. | 3,126 | 2,730 | 2,728 | 2,952 | 1,845 | 1,570 |
| Elongation-% M.D. | 182 | 189 | 337 | 127 | 133 | 192 |
| Elongation-% T.D. | 229 | 238 | 700 | 460 | 496 | 411 |
| Modulus at 1%-psi M.D. | 5,770 | 6,310 | 3,300 | 85,000 | 9,130 | 9,090 |
| Modulus at 1%-psi T.D. | 5,660 | 4,790 | 10,100 | 46,150 | 14,760 | 6,460 |
| Tear Strength-gms/mil M.D. | 64 | 386 | 106 | 37 | 233 | |
| Tear Strength-gms/mil T.D. | 120 | 208 | 115 | 95 | 137 | |
| Embossed Thickness-mil | — | 1.10 | 4.0 | 3.90 | 3.50 | 4.0 |
| Thickness by Weight-mil | 0.80 | 0.80 | 0.97 | 1.04 | 1.03 | 0.99 |
| Impact Strength, gms 50% (Drop Dart) | — | 313 | 240 | <40 | 16 | 142 |
| Gloss at 45° | 88.1 | 39.0 | 7.0 | 2.9 | 7.3 | 4.8 |
| Slip, gms (male to male) | >2.08 | >2.08 | 92 | 0.39 | 0.47 | 0.58 |
| Stress at 25% gms/in. | — | — | 484 | — | 781 | 606 |

[1] Low Density Polyethylene, Density = 0.922, Melt Index = 4.0
[2] Low Density Polyethylene, Density = 0.923, Melt Index = 2.0
[3] Polyvinyl Chloride - Ethyl PVC Film MS6
[4] Ethylene:Vinyl Acetate Copolymer, Density = 0.927, Melt Index = 1.3
[5] High Density Polyethylene, Density = 0.950, Melt Index = 0.3

TABLE II

| | Film Type | | | | |
|---|---|---|---|---|---|
| Operating Conditions | VINYL[3] | EVAC[4] | HDPE[5] | LDPE[1] | LDPE[2] |
| Air oven temperature, °F | 400 | 475 | 400 | 400 | 475 |
| Blower speed, rpm | 1,250 | 1,200 | 1,200 | 1,400 | 1,400 |
| Embosser nip pressure, lb/in. | 400 | 530 | 400 | 330 | 455 |
| Engraved roll coolant temp., °F | 98 | 65 | 95 | 95 | 85 |

TABLE II-continued

| Operating Conditions | Film Type | | | | |
|---|---|---|---|---|---|
| | VINYL[3] | EVAC[4] | HDPE[5] | LDPE[1] | LDPE[2] |
| Rubber roll coolant temp., °F | 10 | 12 | 15 | 14 | 15 |

[1]Low Density Polyethylene, Density = 0.922, Melt Index = 4.0
[2]Low Density Polyethylene, Density = 0.923, Melt Index = 2.0
[3]Polyvinyl Chloride - Ethyl PVC Film MS6
[4]Ethylene: Vinyl Acetate Copolymer, Density = 0.927, Melt Index = 1.3
[5]High Density Polyethylene, Density = 0.950, Melt Index = 0.3

The process of the present invention is particularly suitable for in-line embossing of thermoplastic thin films produced by the blown bubble process. The blown bubble as it is brought down from the bubble tower may be slit at its edges to provide two sheets of thermoplastic film which can be fed to two embossing apparatuses constructed in accordance with the drawing. By the utilization of the process of the present invention, a wide variety of embossed films having a wide range of physical properties such as tensile, modulus, embossed thickness, embossed pattern, softness, gloss, can be produced from one feed film made from one standard density resin. By adjusting process parameters such as the degree of heat, the temperature of the film entering the embossing rollers, the pressure of the embossing rollers, the pattern of the embossing rollers, the temperature of the surface of the embossing roller and backup rollers, it is possible to produce a wide variety of embossed film having the desired physical properties from one standard feed film produced from a single stock resin. By utilizing film produced directly from a blown bubble process, gauge variations are automatically distributed across the width of the embossed film and thus the embossed film produced by the present process produces rolls of embossed film having excellent conformation and thus excellent machinability and printability. The rolls of embossed film produced by this invention are characterized in that they have no hard or soft spots and that any minor gauge variations are uniformly distributed across the width of the roll of produced embossed film. By carefully controlling the speed of the draw or pull rolls, it is possible to either apply limited tension to the film or no tension at all in order to produce the desired end product. For example, if it is desired to produce film having good tensile values, i.e., stress values (stress = tensile strength at 25 percent elongation), one can retard slightly the speed of the pull rolls and thus produce a slight orientation in the heated web as it passes into the nip of the embosser-backup roll. Edge curl in the embossed taffeta film of the present invention may be controlled by varying the temperatures of the surface of the steel embossing roll and the surface temperature of the rubber backup roll.

While the drawing and the description hereinbefore of the preferred apparatus indicates that draw rolls may be used to feed the film into the embossing apparatus, it is not necessary that draw rolls be supplied. Any means of feeding the film into the heating zone into the embossing nip is satisfactory, e.g., a single idler roller or equivalent where the embossing and resilient rolls are driven to pull the film through these rolls. Further, while two heat sources, one on each side of the film, are desirable, it is not necessary that two be used since the process may be performed by using a single heat source and allowing sufficient time for the heat to penetrate from one side of the film to the other. However, the most desirable process conditions are obtained by utilizing dual heat sources, one on each side of the moving plastic film.

While there has been described what is at present considered preferred embodiments of the present invention, it will be apparent to those skilled in the art that various modifications and changes may be made without departing from the essence of the invention. It is intended to cover herein all such modifications as come within the true scope and spirit of the following claims.

What is claimed is:

1. In a method for embossing a thermoplastic film prepared from a crystalline or semi-crystalline polymer or copolymer, the steps comprising:
   a. continuously passing a vertically extending length of said film through a narrow, transverse heating zone extending the full width of said film;
   b. applying a high velocity stream of air heated to a temperature of from about 200°F to about 800°F to each side of said film over opposite areas defined by said heating zone to raise the temperature of the film as it leaves said heating zone to a uniform temperature within the range of about ±20°F of the crystalline melting point of the polymer or copolymer; and
   c. simultaneously quenching and embossing said heated film at one end of said heating zone by passing said heated film between the nip of a pair of embossing rolls, one of said rolls being an engraved metal roll having its surface temperature maintained in a range of from about 70°F to about 170°F lower than the crystalline melting temperature of the polymer or copolymer, and the other of said rolls being a resilient covered roll having its surface temperature maintained in the range of from about 125°F to about 180°F lower than the crystalline melting temperature of the polymer or copolymer.

2. The method of claim 1 wherein the polymer or copolymer is a polymer or copolymer of an alpha-olefinic hydrocarbon having from two to four carbon atoms.

3. The method of claim 1 wherein the crystalline or semi-crystalline polymer or copolymer is a polymer or copolymer of ethylene.

4. In a method for embossing a thermoplastic film prepared from a polymer or copolymer of an alpha-olefinic hydrocarbon having from two to four carbon atoms, the steps comprising:
   a. continuously passing a vertically extending length of said film through a narrow, transverse heating zone extending the full width of said film;
   b. applying a high velocity stream of air heated to a temperature of from about 200°F to about 800°F to each side of said film over opposite areas defined by said heating zone to raise the temperature of the film as it leaves said heating zone to a uniform temperature in the range of from about 220°F to about 250°F; and c. simultaneously quenching and embossing said heated film at one end of said heating zone by passing said heated film between the nip of a pair of embossing rolls having their surfaces maintained at a temperature in the range of from about 60°F to about 170°F.

5. The method of claim 4 wherein said pair of embossing rolls includes an engraved metal roll having its surface maintained at a temperature in the range of from about 70°F to about 170°F and a resilient covered roll maintained at a temperature in the range of from about 60°F to about 115°F.

6. The method of claim 5 including the steps of supplying a cooling liquid having a temperature of from about 20°F to about 150°F to said metal roll and supplying a cooling liquid having a temperature of from about 5°F to about 100°F to said resilient covered roll.

7. The method of claim 4 wherein said heating zone has a height of from about 6 inches to about 14 inches.

8. The method of claim 4 wherein the polymer or copolymer is a polymer or copolymer of ethylene.

9. The method of claim 1 wherein the crystalline or semi-crystalline polymer is polyethylene.

10. The method of claim 4 wherein the polymer is polyethylene.

* * * * *